United States Patent
Gardner

[15] 3,692,965
[45] Sept. 19, 1972

[54] ANTI-THEFT BATTERY DISCONNECTOR APPARATUS

[72] Inventor: Newell John Gardner, Brentwood Square, 11661 Vincente Blvd., Los Angeles, Calif. 90049

[22] Filed: April 21, 1971

[21] Appl. No.: 135,881

[52] U.S. Cl. .................200/44, 70/258, 307/10 AT, 180/114
[51] Int. Cl. .............................................H01h 9/28
[58] Field of Search ........136/135, 181; 70/159, 258; 339/82; 200/42, 44; 307/10 AT; 180/114

[56] References Cited

UNITED STATES PATENTS

| | | | |
|---|---|---|---|
| 2,768,311 | 10/1956 | Durnin | 200/44 X |
| 3,535,899 | 10/1970 | Gardner et al. | 70/159 X |
| 3,290,458 | 12/1966 | Lattimer | 200/44 |

*Primary Examiner*—Herman J. Hohauser
*Attorney*—Bernard Kriegel and Kendrick, Subkow & Kriegel

[57] ABSTRACT

An anti-theft battery disconnect apparatus for vehicles (e.g., automobiles, boats, and the like) permits quick and effective de-energization of the vehicle's electrical system. A conductor shaft which is electrically connected to one of the battery cables in the vehicle is normally spring-biased into contact with a clamp on one of the battery terminal posts, thereby maintaining a continuous conductive path between the cable and the battery. Manually operable means are provided for selectively moving the conductor shaft out of contact with the battery clamp, against the spring bias, to interrupt the conductive path and de-energize the electrical system of the vehicle. A lock for preventing an unauthorized individual from reconnecting the cable to the battery and re-energizing the vehicle's electrical system includes a spring biased bolt which is automatically operable upon retraction of the conductor shaft to engage the shaft and maintain it out of contact with the battery clamp.

10 Claims, 6 Drawing Figures

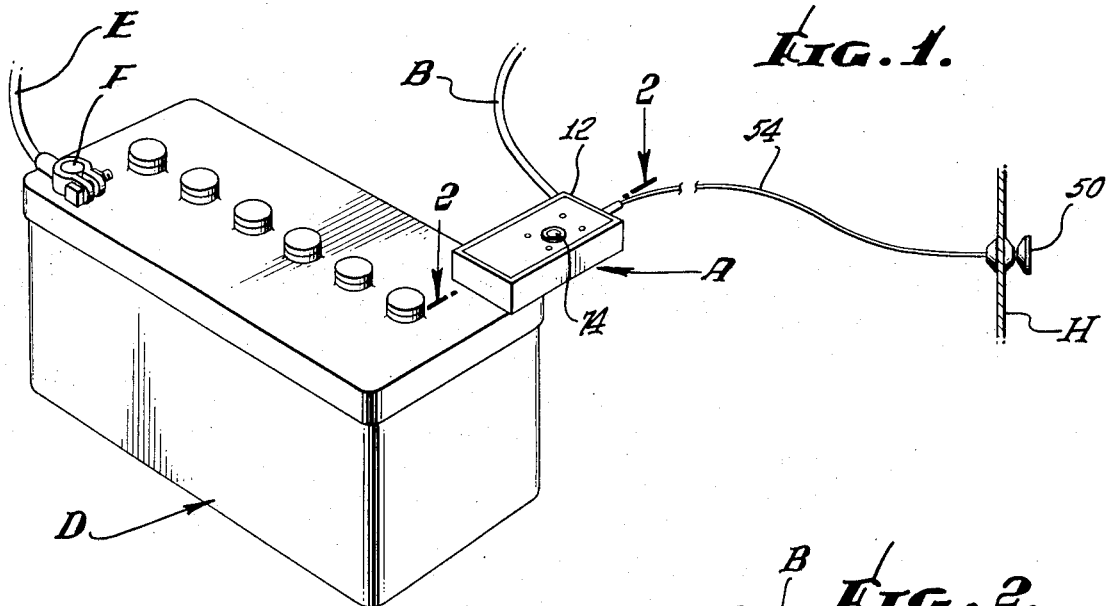
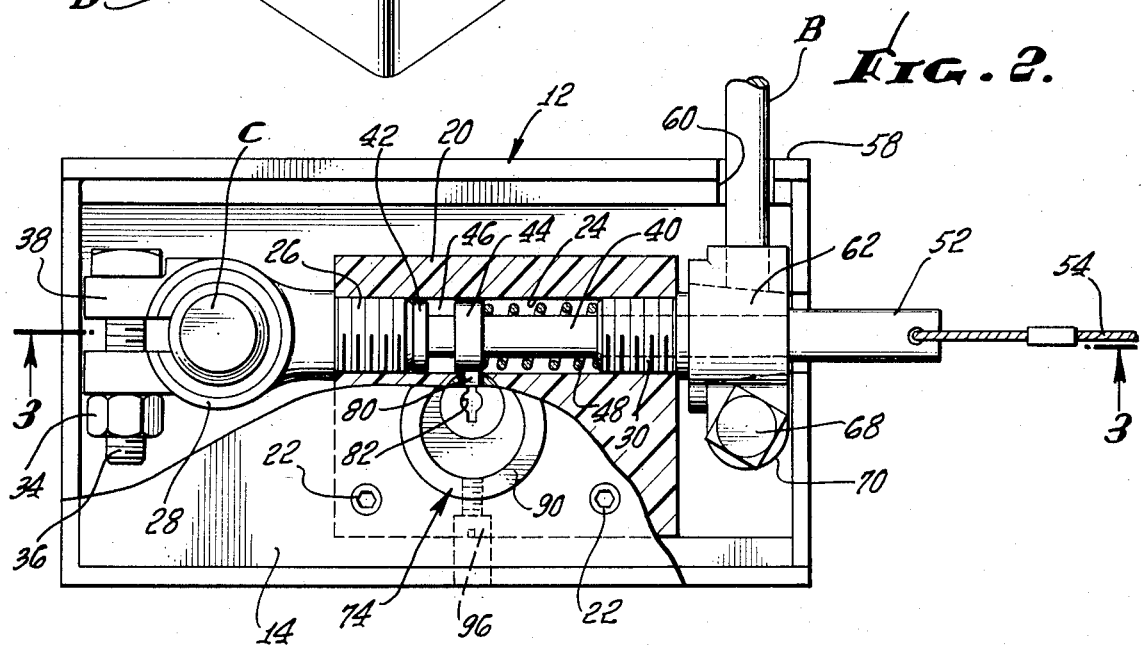
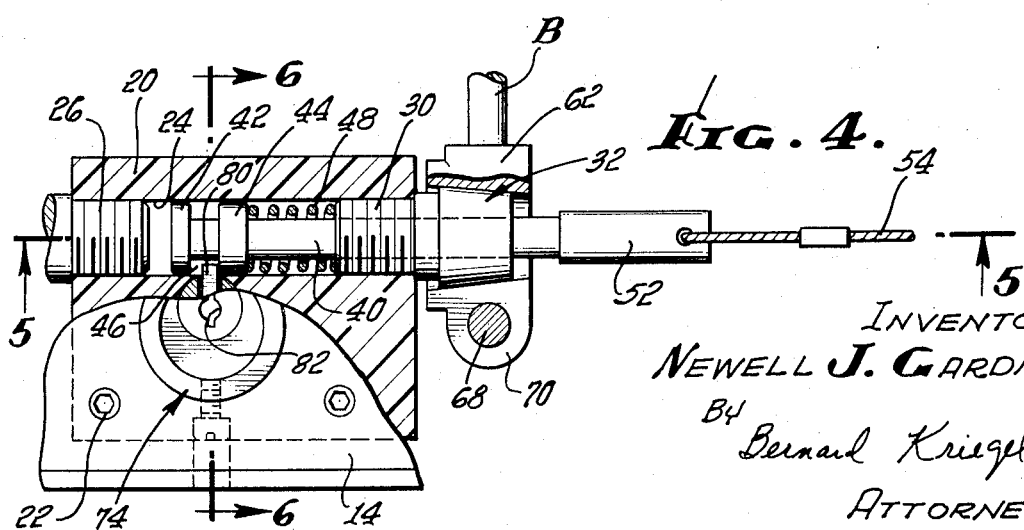

PATENTED SEP 19 1972 3,692,965

INVENTOR.
NEWELL J. GARDNER
BY Bernard Kriegel
ATTORNEY.

3,692,965

ANTI-THEFT BATTERY DISCONNECTOR APPARATUS

The present invention relates to apparatus for effecting ready disconnection and reconnection between a battery and a battery cable, and more particularly to such battery disconnect apparatus which are provided with anti-theft means for preventing thievery of the automobile, boat or other vehicle in which the battery is disposed.

Disconnect devices have been designed for quickly and effectively interrupting the conductive path between a battery cable and the battery in an automobile, boat or other vehicle, to de-energize the vehicle's electrical system. One such device is shown, for example, in U.S. Pat. No. 3,536,876.

To prevent theft or unauthorized use of the vehicle in which the battery is located, it has also been proposed to provide locking means in such battery disconnect devices for preventing theft or unauthorized use of the vehicle in which the battery is located by preventing reconnection of the battery cable to the battery. One such anti-theft battery disconnect device is disclosed in U. S. Pat. No. 3,535,899. That device includes a pair of telescoping conductive members, one of which is electrically connected to one of the battery cables, and the other of which is electrically connected to one of the battery terminals. The telescoping conductive members are urged one from the other by a spring, but are held in contact, against the action of the spring, by a releasable pin. To interrupt the conductive path between the battery cable and the battery terminal, the releasable pin is removed, (e. g., by a suitable pull wire connected to an actuator knob on the dash of the automobile in which the device is located), whereupon the spring will move the conductive members out of contact with one another. The conductive members may be moved into contact with one another by manual force applied to a projecting arm on one of the conductive members. A removable housing provides an abutment in the path of the projecting arm to prevent an unauthorized individual from reengaging the conductive members, and an anti-theft lock is provided for locking the housing in place. While this device is effective in operation, and relatively inexpensive and simple to manufacture and install, it is somewhat cumbersome in use in that the lock and housing can only remain in place over the telescoping conductive members so long as these members are disconnected. The lock and the housing must be manually removed when the battery cable is to be electroconductively connected to the battery post, and must be manually replaced over the conductive members to lock them in their disconnected positions.

The anti-theft battery disconnect device of the present invention permits quick and effective de-energization of the electrical system of the vehicle in which the battery is located and prevents theft or unauthorized use of the vehicle, yet it is simpler and less cumbersome in use than the prior art anti-theft battery disconnect devices.

The present invention possesses many other advantages, and has other purposes which will become more clearly apparent from a consideration of a form in which it may be embodied. This form is shown in the drawings which accompany and form part of the present specification. It will now be described in detail, for the purpose of illustrating the general principles of the invention; but it is to be understood that such detailed description is not to be taken in a limiting sense, since the scope of the invention is defined only by the appended claims.

In the drawings:

FIG. 1 is an isometric view illustrating the anti-theft battery disconnect apparatus of the present invention in conjunction with a battery and the dash of a vehicle in which the battery is disposed.

FIG. 2 is a top plan and partial horizontal section of the anti-theft battery disconnect apparatus shown in FIG. 1, taken along the line 2—2 of FIG. 1 and illustrating the various parts of the apparatus in their connected, conducting positions.

FIG. 4 is a partial top plan and horizontal section, similar to FIG. 2, showing the anti-theft battery disconnect apparatus of FIG. 1, with its parts in their disconnected, non-conducting positions.

Figure 5:
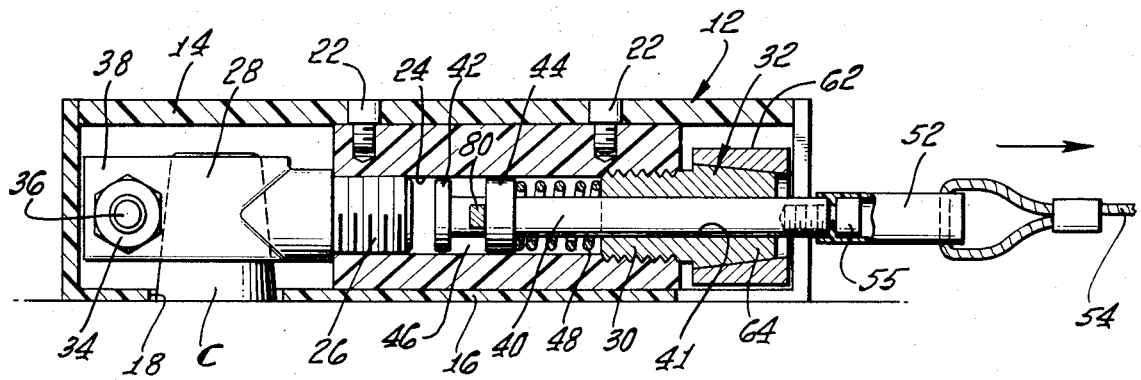
FIG. 5 is a side elevation view and longitudinal section of the apparatus of the present invention with its parts in their disconnected, non-conducting positions (i. e., the same positions shown in FIG. 4).

As disclosed in the drawings, an anti-theft battery disconnect apparatus A is interposed between a battery cable B of a vehicle and one of the battery terminal posts, preferably the negative post C (hidden in FIG. 1; see FIGS. 2, 3 and 5), of a battery D. The other battery cable E is connected in the usual manner to the positive terminal post F of the battery. The battery cable B is normally electrically connected to the negative terminal post C through the disconnect apparatus A, but can be readily disconnected therefrom from a remote point, such as the dash H of the vehicle by a person within the passenger compartment.

The anti-theft battery disconnect unit A includes a generally box-shaped housing 12 having a removable cover plate 14. The bottom wall 16 of the housing is provided with an opening 18 for receiving the negative terminal post C of the automobile battery D.

An insulative (e. g., plastic) connector block 20 is detachably secured in the housing 12 between the cover plate 14 and bottom wall 16 by means of screws 22 which extends through the cover plate 14 and into the upper surface of the connector block 20. The connector block 20 is generally parallelepiped-shaped, having a bore 24 extending longitudinally therethrough. The forward end of the bore 24 is threaded to receive a threaded stub 26 on a clamp 28 which is detachably secured on the negative terminal post C of the battery D (FIG. 1) in the conventional manner by a nut 34 and a bolt 36 which extends through the wings 38, 38 of the clamp. The rear end of the bore 24 is also threaded to receive the threaded end 30 of a tubular fitting 32.

A conductor shaft 40 extends through a longitudinal passage 41 in the tubular fitting 32 and into the longitudinal bore 24 in the connector block 20. The diameter of the passage 41 in the tubular fitting 30 is slightly larger than the diameter of the conductor shaft 40, thereby providing a relatively tight sliding fit of the conductor shaft in the fitting.

A pair of axially-spaced, annular flanges 42, 44 are provided on the forward end of the conductor shaft 38 and define an annular groove 46 therebetween.

The conductor shaft 40 is normally spring-biased forwardly, into contact with the stub 26 on the clamp 28, by means of a helical compression spring 48 disposed between the rear flange 44 on the conductor shaft and the forward end of the tubular fitting 32. The rear end of the conductor shaft 40 is connected to a suitable actuator knob 50 on the dash H of the vehicle (FIG. 1) through an insulative sleeve 52 and a conventional pull wire 54. A screw 55 secures the end of shaft 40 to the insulative sleeve 52. Thus, by exerting a pulling force on the pull wire 54 (via the actuator knob 50), the conductor shaft 40 may be moved rearwardly, out of contact with the stub 26 on clamp 28, against the force of spring 48. The pull wire 54 is preferably arranged in such a manner that the pull is exerted axially of the conductor shaft 48, enabling it to be moved rearwardly, against the force of the spring 48, with relative ease.

As best shown in FIG. 2, one side 58 of the housing 12 is provided with a slot 60 for receiving the terminal end of battery cable B and a clamp 62 which is mounted thereon. The cable clamp 62 is detachably secured to the enlarged rear end 64 of the tubular fitting 32 by a conventional nut 66 and a bolt 68 which extends through the wings 70, 70 of the clamp.

From the foregoing it will be appreciated that when the conductor shaft 40 is in its forward position (FIGS 2 and 3) a conductive path is established between the battery cable B and the negative battery terminial C via the clamp 62 on cable B, the tubular fitting 32, the conductor shaft 40, and the stub 26 on the clamp 28. De-energization of the electrical system of the vehicle may be quickly effected by simply pulling on the actuator knob 50 (FIG. 1) on the dash H to move the conductor shaft rearwardly, out of contact with the stub 26 on clamp 28, and thereby interrupt the conductive path between the cable B and the terminal post C.

Figure 6:
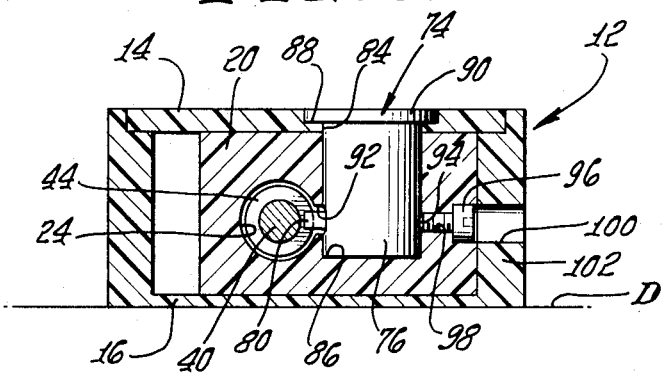
FIG. 6 is a transverse section of the apparatus of the present invention, taken along the line 6—6 of FIG. 4.

In accordance with the present invention, the disconnect apparatus A is provided with an anti-theft lock 74 to prevent the conductor shaft 40 from being moved back into contact with the stub 26 on clamp 28. As best shown in FIG. 6, the lock 74 is generally conventional, per se, having a retractable bolt 80 which is pring-biased radially outwardly through an opening in the lower portion of the cylindrical body 76 of the lock. The bolt 80 is adapted to be retracted into the body 76 of the lock 74 by a suitable key (not shown) inserted into a key slot 82 (FIGS. 2 and 4) in the upper end of the lock.

As best shown in FIG. 6, the lock 74 extends through an opening 84 in the cover plate 14 and into a cylindrical cavity 86 in the connector block 20. The opening 84 in the cover plate 14 is countersunk to provide an annular seat 88 which receives a circumferential flange 90 on the upper end of the lock 74.

The lower end of the cylindrical lock-receiving cavity 86 communicates with the longitudinal passage 24 in the connector block via a short transverse passage 92 (FIG. 6) through which the retractably bolt 80 extends.

It will be noted that the disposition of the bolt 80 in the short transverse passage 92 (FIG. 6) between the lock-receiving cavity 86 and the longitudinal passage 24 in the connector block 20 prevents removal of the lock 74 from the unit A. The flange 90 of lock 74 prevents removal of the cover plate 14 from the housing 12 even if the screws 22 are removed. Access to the interior of the housing may not be had until the bolt 80 of lock 74 is retracted by a proper key and the lock is removed. Thus, no unauthorized person can open or remove the housing and connect the cable B to the terminal post C.

When the conductor shaft 40 is in its rear, retracted position (FIGS. 4 and 5), the bolt 80 extends into the annular slot 46 between the annular flanges 42 and 44 on the shaft 40, thereby locking the shaft against forward movement and preventing re-establishment of the conductive path between the battery and the cable.

To retract the bolt 80 and permit the spring 48 to return the conductor shaft 40 to its forward position, in contact, with the stub 26 on the clamp 28, a suitable key (not shown) is inserted into the key slot 82 and turned. A notch 94 in the lower portion of the lock 74 cooperates with the end of a set screw 96 which is threaded into a hole 98 in the side of the connector block 20 (FIG. 6) to prevent the lock from turning in the cavity 86 when the key is turned. An access hole 100 is provided in the side wall 102 of the housing 12, in alingment with the internally threaded hole 98 in the connector block, for permitting a suitable tightening device (e. g., a wrench or screw driver) to be applied to the head of the set screw 96.

Figure 3:
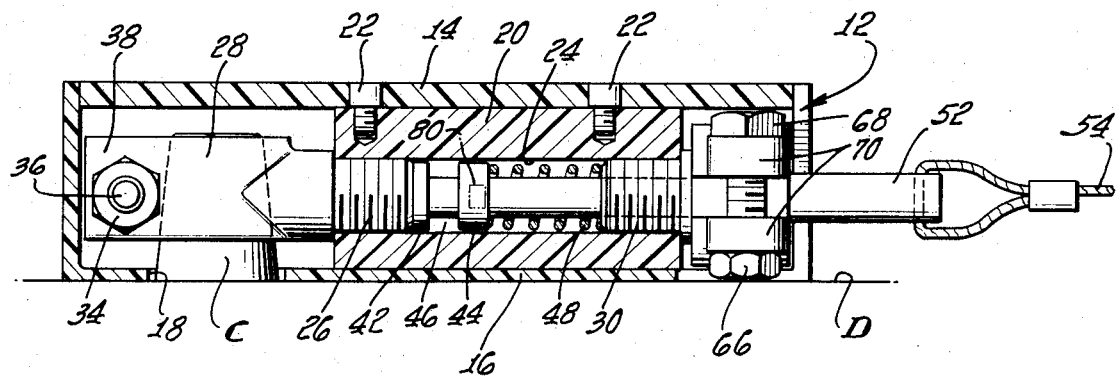
FIG. 3 is a side elevation view and longitudinal section taken along the line 3—3 of FIG. 2.

As best shown in FIGS. 2 and 3, when the conductor shaft 40 is in its forward position, the spring biased bolt 80 is maintained in its retracted position by the annular flange 44 adjacent the forward end of the shaft.

From the foregoing description it is evident that if a hazardous condition develops in the region of the engine of the vehicle in which the disconnect unit A is located, such as the breaking of a fuel line or a spark being produced by a live wire, or from another source, the electrical system of the vehicle can be quickly and completely de-energized by simply pulling the conductor shaft 40 rearwardly, out of contact with the stub 26, via the pull wire 54 and the actuator knob 50 on the vehicle dash H. As the conductor shaft and the enlarged flange 44 thereon are moved rearwardly, the annular slot 46 between the flanges 42 and 44 will register with the transverse passage 92 in the conductor block, and the spring-biased bolt 80 will be moved into the slot 46, thereby preventing the conductor shaft from moving forwardly, under the force of spring 48, and re-engaging the stub 26.

When it is desired to re-establish a continuous conductive path between the battery cable B and the negative battery terminal C, it is necessary to insert a proper key (not shown) into the key slot 82 and retract the bolt 80. Thus, the electrical system of the automobile cannot be energized without the proper key. This feature serves to prevent theft of the vehicle, or any other unauthorized use.

It is contemplated, of course, that various modifications and changes may be made to the preferred embodiment disclosed in the drawings and described above without departing from the spirit and scope of the present invention. Accordingly, it is intended that the invention be limited only by the scope of the appended claims.

I claim:

1. Anti-theft battery disconnect apparatus comprising: disconnect means connectible to a battery cable and to a battery post, and including a first electroconductive member adapted to be secured to the post, a second electroconductive member adapted for attachment to the cable, and a third electroconductive member electrically connected to one of said first and second members and shiftable into and from engagement with the other of said first and second members, a housing structure containing and enclosing said disconnect means and adapted to enclose the battery post with said first member secured to the battery post, whereby said housing structure prevents access to the post and disconnect means; and lock means in said housing structure including a bolt normally engageable with said third member to retain said third member disengaged from said first and second members, said lock means including key operable means for shifting said bolt from retaining engagement with said third member to allow shifting of said third member into engagement with said other of said first and second members.

2. In apparatus as defined in claim 1; said bolt engaging said housing structure when in retaining engagement with said third member to prevent removal of said housing structure from the battery post.

3. In apparatus as defined in claim 1; spring means in said housing structure engaging said third member to urge said third member into engagement with said other of said first and second members when said bolt is shifted from retaining engagement with said third member; and means connected to said third member for shifting said third member from engagement with said other of said first and second members.

4. In apparatus as defined in claim 1; said third member being connectible to said second member and shiftable into and from engagement with said first member.

5. In apparatus as defined in claim 1; said third member being connectible to said second member and shiftable into and from engagement with said first member; spring means in said housing structure engaging said third member to urge said third member into engagement with said first member when said bolt is shifted from retaining engagement with said third member; and means connected to said third member for shifting it from engagement with said first member.

6. Anti-theft battery disconnect apparatus comprising: disconnect means connectible to a battery cable and to a battery post, and including an electroconductive shiftable member in the electric circuit between the battery cable and post and movable between a closed position at which the cable and the post are electroconductively connected, and an open position at which the cable and the post are disconnected; a housing enclosing said disconnect means; a fixed structure within and connected to said housing; and lock means within said structure for locking said shiftable member in its said open position and for locking said housing over said disconnect means; said lock means including a bolt; means normally biasing said bolt to an extended position wherein said bolt engages said fixed structure connected to said housing, thereby preventing removal of said housing; means for moving said shiftable member to its said open position; said shiftable member including keeper means for receiving said bolt and preventing movement of said shiftable member to its said closed position when said shiftable member is in its said open position and said bolt is in its extended position; and key-operable means for moving said bolt to its said retracted position, wherein said shiftable member may be moved to its said closed position and said housing may be removed from said disconnect means.

7. Anti-theft battery disconnect apparatus comprising: disconnect means connectible to a battery cable and to a battery post, and including an electroconductive shiftable member in the electric circuit between the battery cable and post and movable between a closed position at which the cable and the post are electroconductively connected, and an open position at which the cable and the post are disconnected; a housing enclosing said disconnect means; a fixed structure connected to said housing; and lock means for locking said shiftable member in its said open position and for locking said housing over said disconnect means; said lock means including a bolt; means normally biasing said bolt to an extended position wherein said bolt engages said fixed structure connected to said housing, thereby preventing removal of said housing; means for moving said shiftable member to its said open position; said shiftable member including keeper means for receiving said bolt and preventing movement of said shiftable member to its said closed position when said shiftable member is in its said open position and said bolt is in its extended position; and key-operable means for moving said bolt to its said retracted position, wherein said shiftable member may be moved to its said closed position and said housing may be removed from said disconnect means; and further comprising means for maintaining said bolt in a partially retracted position, between said extended and retracted positions, when said shiftable member is in its closed position; said bolt, when in its said partially retracted position, engaging said fixed structure connected to said housing for preventing removal of said housing.

8. in a battery disconnect apparatus insertable between an electric battery and a battery cable for selectively interrupting the conductive path between the battery and the cable: a housing adapted to be secured over the terminal post of an electric battery and one end of a battery cable which is spaced from the terminal post; a fixed structure connected to said housing; a clamping member in said housing for electroconductively engaging the terminal post of a battery over which said housing is secured; a conductive member in said housing and shiftable into and out of contact with said clamping member; means for electroconductively connecting said conductive member to the end of a battery cable over which said housing is secured; means normally biasing said conductive member into contact with said clamping member; actuator means for shifting said conductive member out of contact with said clamping member; anti-theft means for preventing removal of said housing and for preventing shifting of said conductive member into contact with said clamping member; said anti-theft means comprising a key-operable lock having a bolt movable between an extended position and a retracted position; keeper means on said conductive member for engaging said bolt when said bolt is in its said extended position for preventing shifting of said conductive member into contact with said clamping member; said fixed structure connected to said housing including means for engaging said bolt when said bolt is not in its retracted position for preventing removal of said housing; and key-operable means for moving said bolt to its said retracted position to permit removal of said housing.

9. in a battery disconnect apparatus insertable between an electric battery and a battery cable for selectively interrupting the conductive path between the battery and the cable: an insulator housing having a first opening adapted to receive one of the terminal posts of an electric battery, and a second opening adapted to receive the end of a battery cable; an insulator connector block mounted in said housing; said connector block including a bore extending therethrough, a lock-receiving cavity spaced from said bore, and a connecting passage extending between said bore and said cavity; a clamp having an extension mounted in one end of said bore in said connector block; said clamp being disposed externally of said connector block in proximity to said first opening in said housing; said clamp being adapted to be electroconductively secured on a battery terminal post extending through said first opening in said housing; a conductor shaft extending through the other end of said bore in said connector block and slidably disposed therein; spring means normally biasing said conductor shaft into contact with said clamp; actuator means for moving said conductor shaft out of contact with said clamp, against the bias of said spring means; a cable connector mounted in said other end of said bore in sliding electroconductive contact with said conductor shaft; said cable connector being adapted to be electroconductively connected to the terminal end of a battery cable inserted through said second opening of said housing; anti-theft means for preventing removal of said housing and for preventing shifting of said conductive shaft into contact with said clamp; said anti-theft means comprising a key operable lock extending through one wall of said housing and into said lock receiving cavity in said insulative connector block; said lock including a bolt movable between an extended position wherein it extends through said connecting passage in said connector block and into said bore, and a retracted position within said lock-receiving cavity of said connector block; said conductor shaft including flange means adapted to engage said bolt and prevent movement of said conductor shaft into contact with said clamp when said bolt is in its said extended position; said bolt, when not in its said retracted position; cooperating with said connecting passage in said connector block to prevent removal of said housing; said lock further comprising key-operable means for moving said bolt to its said retracted position; said key-operable means including a key slot accessible from outside of said housing.

10. Anti-theft battery disconnect apparatus as defined in claim 9, wherein said lock and said lock receiving cavity are generally cylindrical; and further comprising a set screw extending through said housing and said connector block and into contact with said lock for preventing said lock from turning in said cavity when a key is inserted into said lock and turned to retract said bolt.

* * * * *

PO-1050
(5/69)

UNITED STATES PATENT OFFICE
CERTIFICATE OF CORRECTION

Patent No. __3,692,965__ Dated __September 19, 1972__

Inventor(s) __NEWELL JOHN GARDNER__

It is certified that error appears in the above-identified patent and that said Letters Patent are hereby corrected as shown below:

Change the title of the patent to --ANTI-THEFT BATTERY DISCONNECT APPARATUS--.

Column 3, line 30, after "a" insert --continuous--.
line 45, change "pring" to --spring--.

Column 5, line 9, change the "," to a --;--.

Column 6, line 40 (line 1 of claim 8), change "in" to --In--.

Column 7, line 8, change "in" to --In--.

Signed and sealed this 6th day of March 1973.

(SEAL)
Attest:

EDWARD M. FLETCHER, JR.
Attesting Officer

ROBERT GOTTSCHALK
Commissioner of Patents